United States Patent
Yu et al.

(10) Patent No.: US 11,072,935 B1
(45) Date of Patent: Jul. 27, 2021

(54) POOL FILTER GUARD METHOD AND APPARATUS

(71) Applicants: John Yu, Granada Hills, CA (US); Richard Yu, Granada Hills, CA (US)

(72) Inventors: John Yu, Granada Hills, CA (US); Richard Yu, Granada Hills, CA (US)

(*) Notice: Subject to any disclaimer, the term of this patent is extended or adjusted under 35 U.S.C. 154(b) by 0 days.

(21) Appl. No.: 17/094,918

(22) Filed: Nov. 11, 2020

(51) Int. Cl.
E04H 4/06 (2006.01)
E04H 4/12 (2006.01)
E04H 4/14 (2006.01)

(52) U.S. Cl.
CPC ............ E04H 4/06 (2013.01); E04H 4/1272 (2013.01); E04H 4/14 (2013.01)

(58) Field of Classification Search
CPC ....... E04H 4/06; E04H 4/1254; E04H 4/1272; E04H 4/14; E04H 4/16
See application file for complete search history.

(56) References Cited

U.S. PATENT DOCUMENTS

| 9,581,478 | B1* | 2/2017 | Smith | G01F 1/666 |
| 9,932,747 | B2* | 4/2018 | Greenwald | E04H 4/1272 |
| 10,458,137 | B1* | 10/2019 | Hodak | E04H 4/1272 |
| 10,604,954 | B2* | 3/2020 | Shalon | C02F 1/008 |
| 10,737,951 | B2* | 8/2020 | Miller | C02F 1/66 |
| 2008/0106422 | A1* | 5/2008 | Sparks | E04H 4/14 340/573.6 |
| 2012/0187029 | A1* | 7/2012 | Lauro | E04H 4/14 210/85 |
| 2017/0314282 | A1* | 11/2017 | Nix | E04H 4/1245 |
| 2018/0222770 | A1* | 8/2018 | Poirier | E04H 4/1272 |
| 2019/0087548 | A1* | 3/2019 | Bennett | E04H 4/1654 |
| 2019/0136557 | A1* | 5/2019 | Jensen | G01F 23/00 |
| 2019/0287378 | A1* | 9/2019 | Rogers | G08B 21/084 |

* cited by examiner

Primary Examiner — David P Angwin
Assistant Examiner — Nicholas A Ros
(74) Attorney, Agent, or Firm — Edmond DeFrank

(57) ABSTRACT

The embodiments disclose a method including fabricating a pool filter guard apparatus including a pool filter guard debris screen and spreader anchor apparatus installation device for coupling to the pool filter guard apparatus for installing into a pool skimmer to prevent debris from clogging a pool skimmer basket, fabricating a pool filter guard angular safety module with infrared detection sensors, chemical testing devices, temperature sensors, WIFI and cellular connectivity, a digital processor, digital memory device, panoramic camera for reporting pool conditions to a pool owner and for transmitting alerts on potential unintentional drowning, and creating a pool filter guard digital app for installation in a user digital device for receiving real-time pool condition reports and alerts transmitted from the pool filter guard angular safety module.

4 Claims, 13 Drawing Sheets

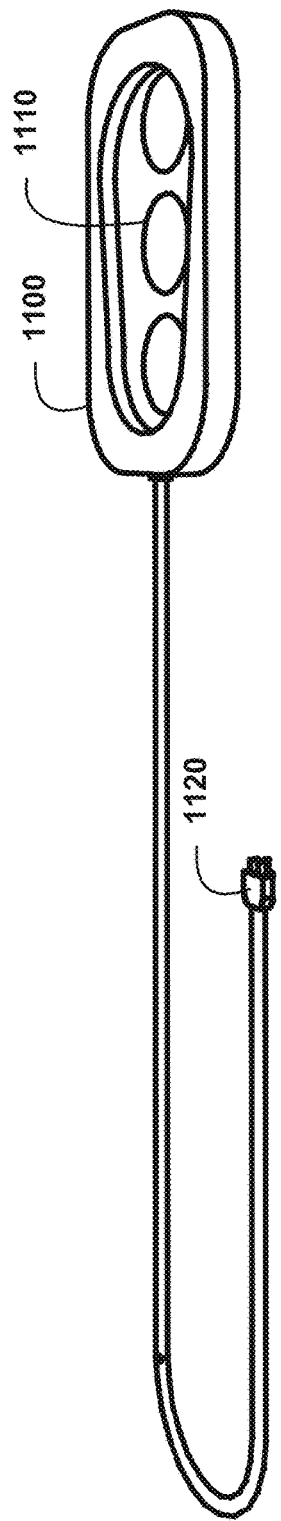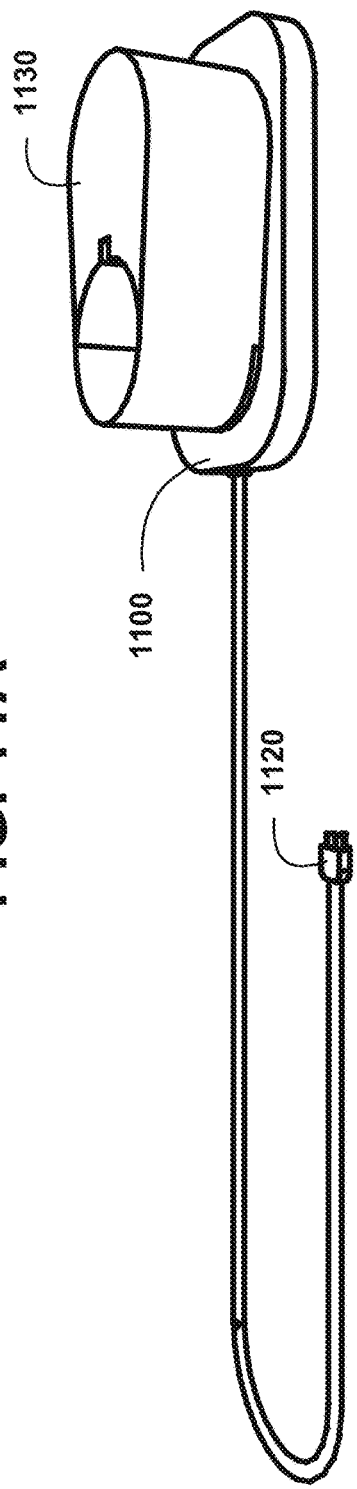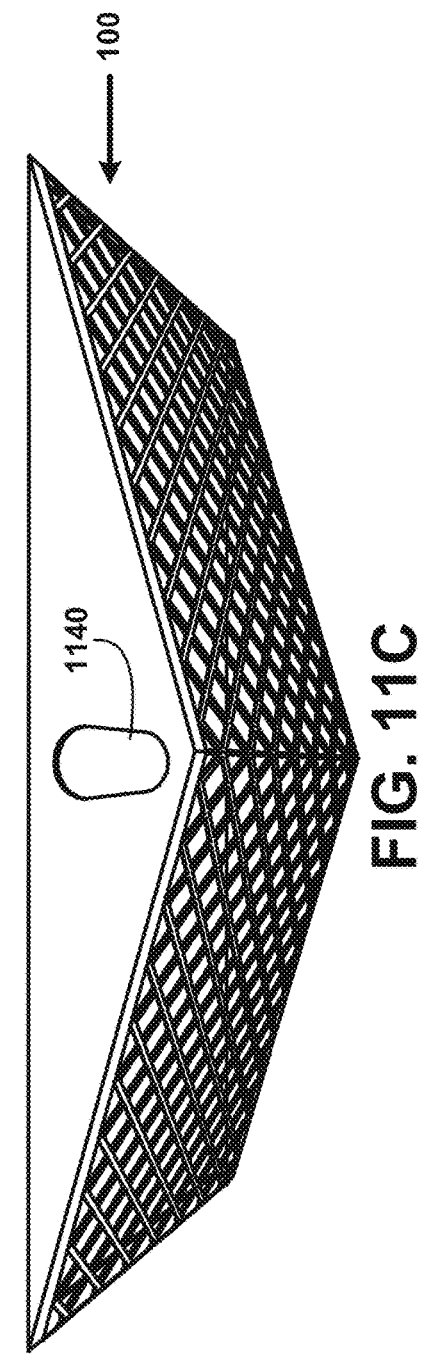

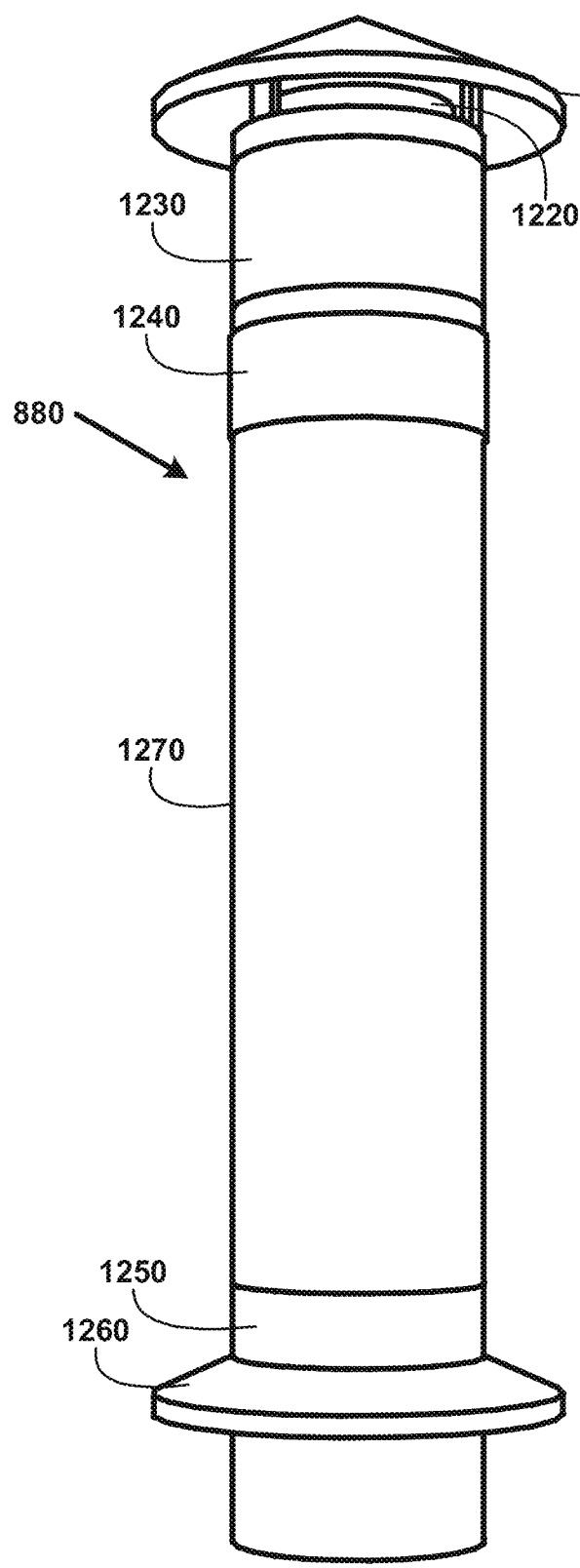
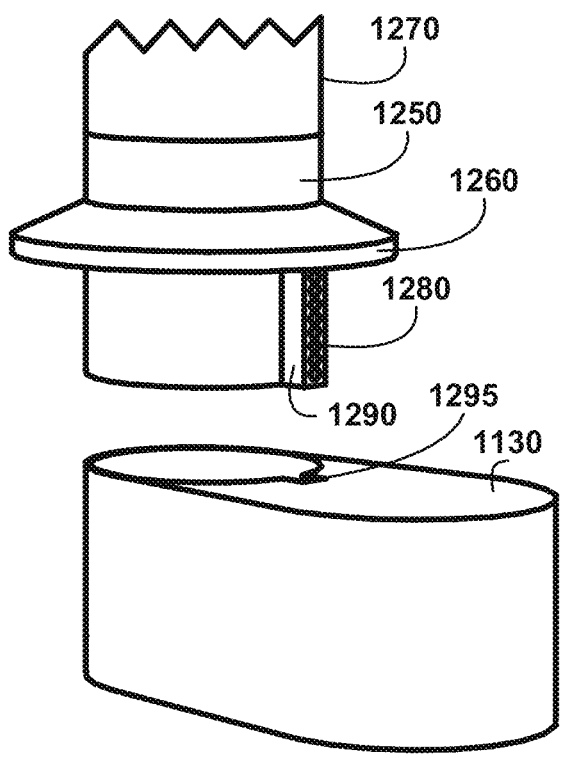
FIG. 12A  FIG. 12B

POOL FILTER GUARD METHOD AND APPARATUS

BACKGROUND

Swimming pools are subject to debris falling or blowing into the water. Pool systems draw water through a skimmer during the water filtering and heating cycles. The debris floating on the water can clog a skimmer filter basket. The pool operator must be vigilant about cleaning out the debris from the skimmer filter basket. A clogged skimmer filter basket in time will wear out the pump motor. Pool safety requires constant surveillance to prevent accidental drownings of pets and particularly unattended young children.

BRIEF

FIG. 11A shows for illustrative purposes only an example of a wireless pool filter guard safety module waterproof battery recharging device of one embodiment.

FIG. 11B shows for illustrative purposes only an example of a wireless pool filter guard safety module waterproof battery of one embodiment.

FIG. 11C shows for illustrative purposes only an example of a top plate recessed battery receiver of one embodiment.

FIG. 12A shows for illustrative purposes only an example of a pool filter guard safety module of one embodiment.

FIG. 12B shows for illustrative purposes only an example of a pool filter guard safety module battery key of one embodiment.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview:

It should be noted that the descriptions that follow, for example, in terms of a pool filter guard method and apparatus is described for illustrative purposes and the underlying system can apply to any number and multiple type's pool skimmer devices. In one embodiment of the present invention, the pool filter guard method and apparatus can be configured using a two part apparatus. The pool filter guard method and apparatus can be configured to include an angular structure and can be configured to include a curved structure using the present invention.

Figure 1:
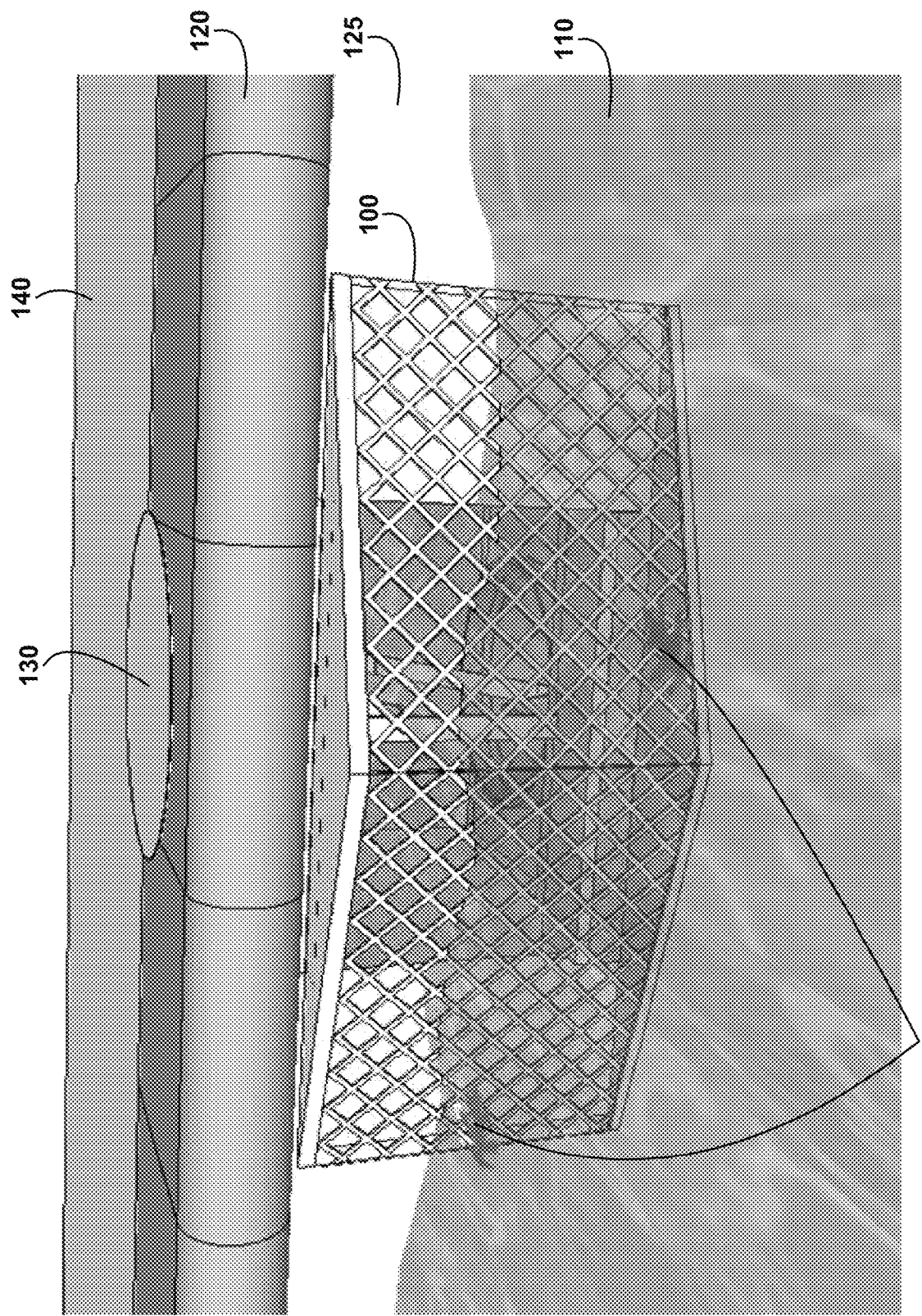
FIG. 1 shows for illustrative purposes only an example of an overview of a pool filter guard method and apparatus of one embodiment.

General Overview:

FIG. 1 shows for illustrative purposes only an example of an overview of a pool filter guard method and apparatus of one embodiment. FIG. 1 shows a pool filter guard angular apparatus 100 installed into a pool skimmer opening. The pool filter guard angular apparatus 100 is partially immersed below a pool water level 110 against a pool side wall 125 and below a pool edge coping 120. A skimmer basket cover 130 is shown inset into pool decking 140. The skimmer basket cover 130 is removed by a pool owner or attendant to clean out a skimmer basket of accumulated debris including for example leaves that have fallen into the pool from a tree. The pool filter guard angular apparatus 100 includes a screen outside of the skimmer opening to reduce and prevent the amount of debris that can clog the skimmer basket and cause damage to the pool pump. FIG. 1 shows debris stopped by the pool filter guard apparatus 150 screen before entering the skimmer and potentially clogging the skimmer basket of one embodiment.

DETAILED DESCRIPTION

Figure 2:
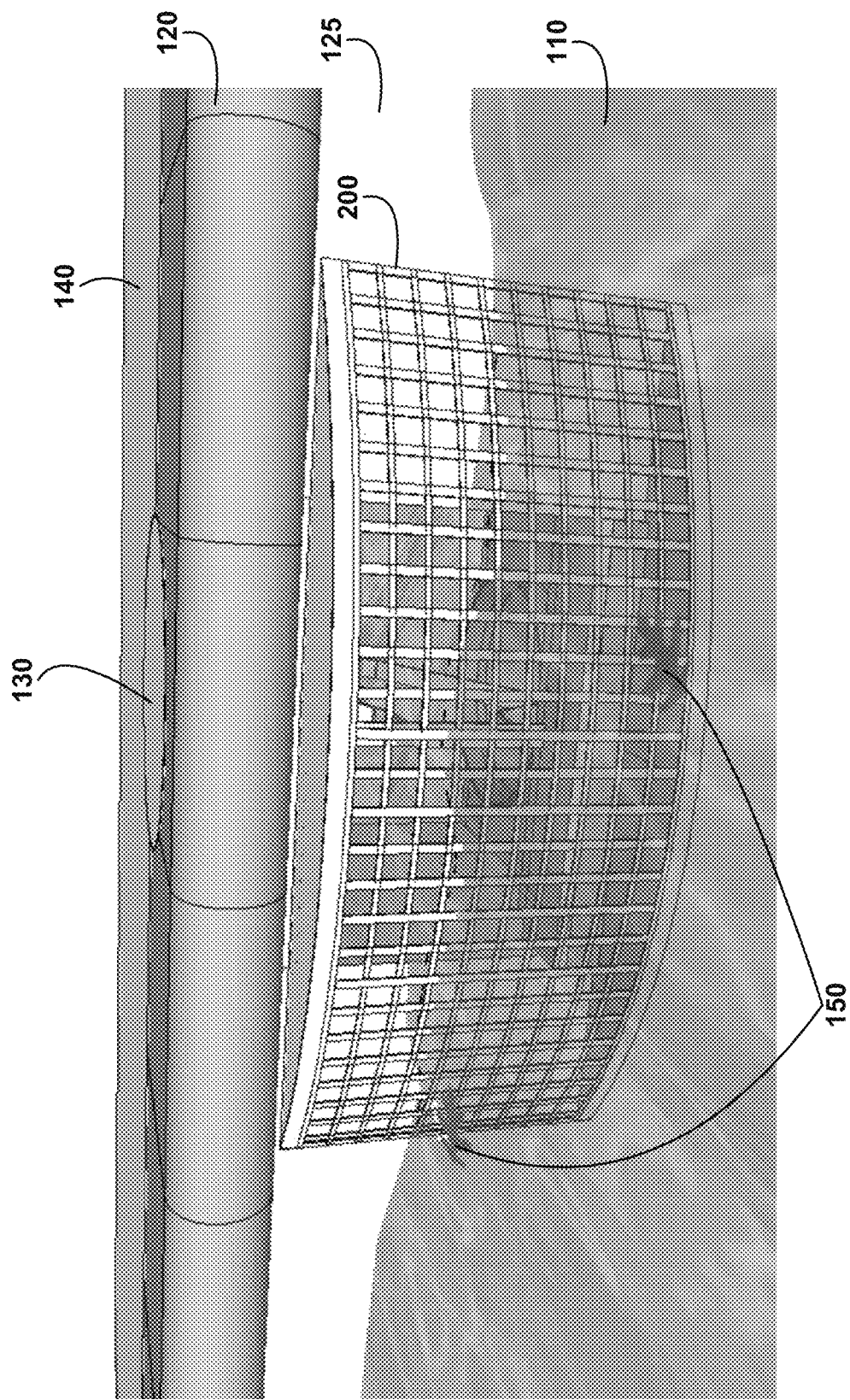
FIG. 2 shows for illustrative purposes only an example of a pool filter guard curved apparatus of one embodiment.

FIG. 2 shows for illustrative purposes only an example of a pool filter guard curved apparatus of one embodiment. FIG. 2 shows a pool filter guard curved apparatus 200 partially below the pool water level 110 and below the pool edge coping 120. The pool filter guard curved apparatus 200 positioned against the pool side wall 125 prevents debris from going around the pool filter guard curved apparatus 200 and entering the skimmer chamber. The skimmer basket cover 130 in place prevents someone from stepping into the recessed skimmer chamber below the pool decking 140. Both the pool filter guard curved apparatus 200 and the pool filter guard angular apparatus 100 of FIG. 1 show debris stopped by the pool filter guard apparatus 150 of one embodiment.

Figure 3A:
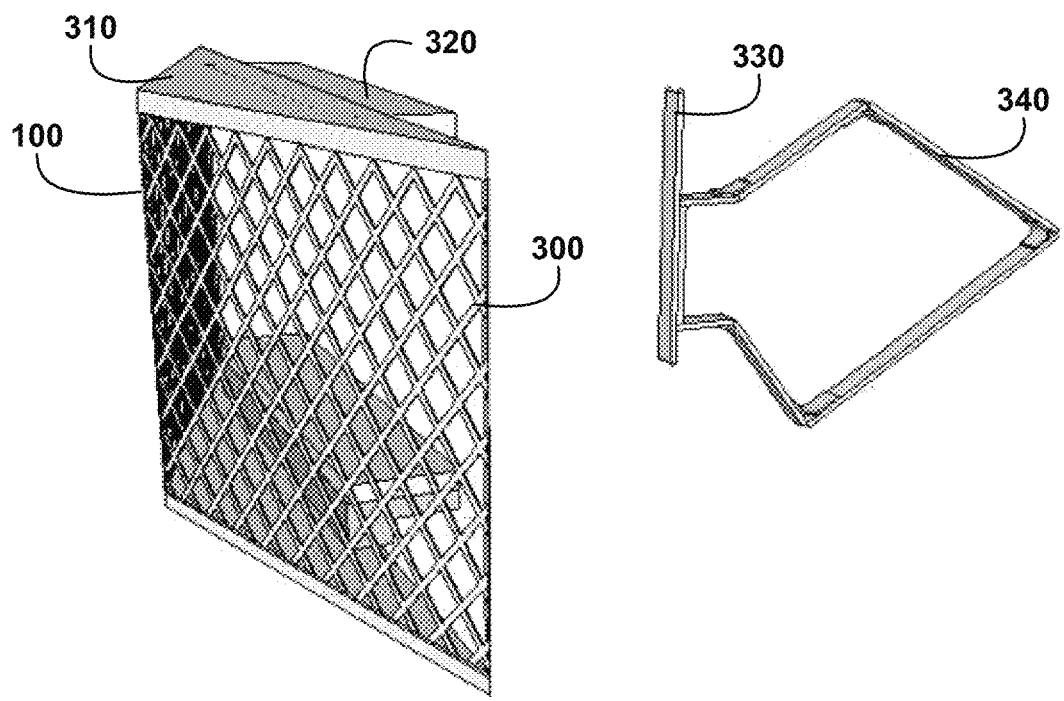
FIG. 3A shows for illustrative purposes only an example of a pool filter guard two part apparatus of one embodiment.

A Pool Filter Guard Two Part Apparatus:

FIG. 3A shows for illustrative purposes only an example of a pool filter guard two part apparatus of one embodiment. FIG. 3A shows two parts of the pool filter guard angular apparatus 100. The first part includes a pool filter guard debris screen 300. The pool filter guard debris screen 300 is coupled to a bottom plate and a top plate 310. The top plate 310 includes a top mounting plate 320 that fits within the skimmer opening. The top mounting plate 320 has a corresponding bottom mounting plate showing behind the pool filter guard debris screen 300. The mounting plates in one embodiment are adjustable to allow an adjustment to fit the skimmer opening size which may vary. A second part includes a coupling bar 330 and attached spreader anchor apparatus 340. The coupling bar 330 is coupled to the top mounting plate 320 and corresponding bottom mounting plate. The spreader anchor apparatus 340 includes segments that are hinged using an integrated springs of one embodiment.

Figure 3B:
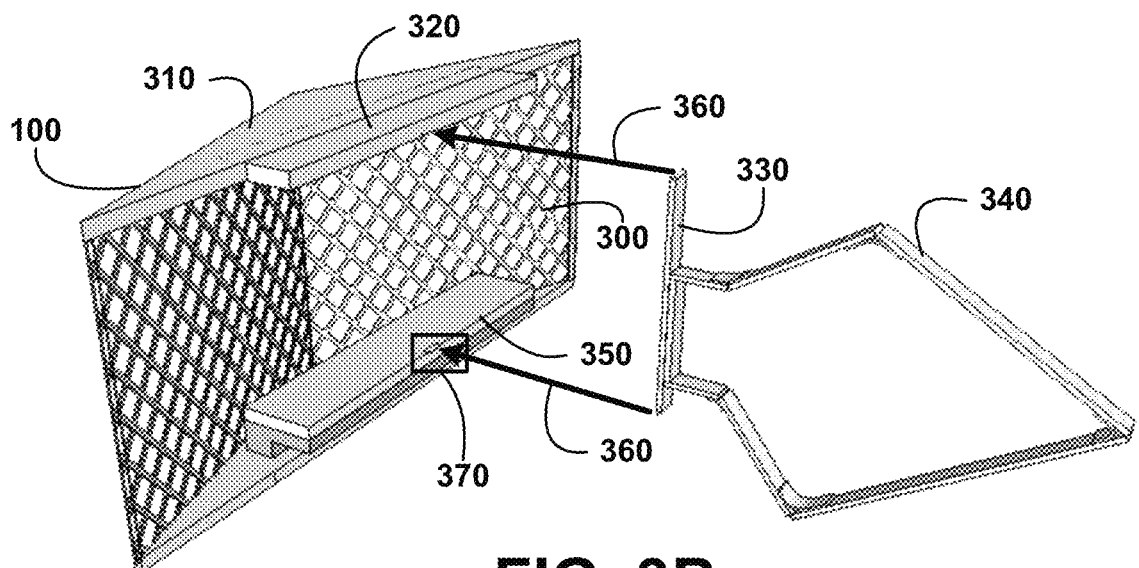
FIG. 3B shows for illustrative purposes only an example of a pool filter guard two part coupling process of one embodiment.

A Pool Filter Guard Two Part Coupling Process:

FIG. 3B shows for illustrative purposes only an example of a pool filter guard two part coupling process of one embodiment. FIG. 3B shows the pool filter guard angular apparatus 100 including the pool filter guard debris screen 300, top plate 310, top mounting plate 320 and a bottom mounting plate 350. The second part includes the coupling bar 330 and hinged spreader anchor apparatus 340. The process to couple the two parts together is accomplished by pressing the coupling bar into the top and bottom mounting plates 360 as shown in detail "A" 370 of one embodiment.

Figure 3C:
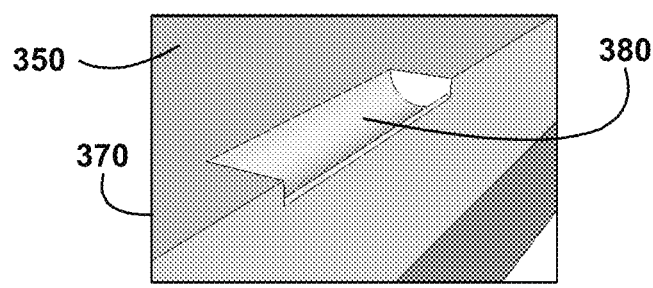
FIG. 3C shows for illustrative purposes only an example of a pool filter guard coupling bar snap-in receptacle of one embodiment.

A Pool Filter Guard Coupling Bar Snap-in Receptacle:

FIG. 3C shows for illustrative purposes only an example of a pool filter guard coupling bar snap-in receptacle of one embodiment. FIG. 3C shows detail "A" 370 wherein the bottom mounting plate 350 includes a coupling bar snap-in receptacle 380. The top plate spreader anchor apparatus 340 of FIG. 3A also includes an inverted coupling bar snap-in receptacle 380 allowing both ends of the coupling bar 330 of FIG. 3A to snap into place completing the coupling of the two parts of one embodiment.

Figure 4A:
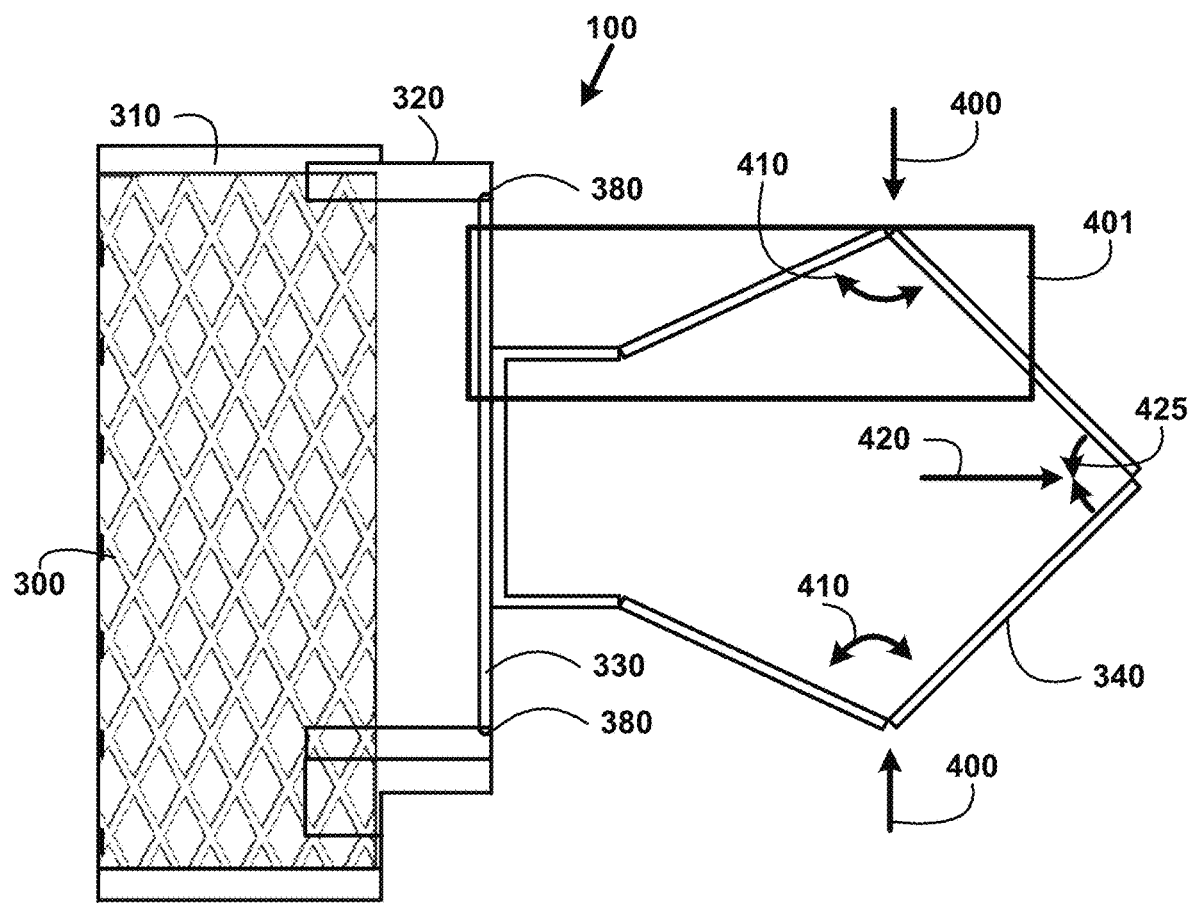
FIG. 4A shows for illustrative purposes only an example of a pool filter guard spreader anchor insertion process of one embodiment.

A Pool Filter Guard Spreader Anchor Insertion Process:

FIG. 4A shows for illustrative purposes only an example of a pool filter guard spreader anchor insertion process of one embodiment. FIG. 4A shows the pool filter guard angular apparatus 100 including the pool filter guard debris screen 300, top plate 310, top mounting plate 320 and coupling bar snap-in receptacle 380 coupled coupling bar 330 and spreader anchor apparatus 340. In a process preliminary to installation into the skimmer opening a user begins by pressing a spreader anchor apparatus inward 400. Pressing the spreader anchor apparatus inward 400 moves spreading anchor segments to a wider angle to narrow a top to bottom 410 distance spread. A detail "B" 401 shows the integrated springs. The process of pressing top and bottom of spreader anchor segments lengthens end segment extended position 420, wherein an angle lessens between extended anchor segments 425 thereby lengthening the extended distance of one embodiment.

Figure 4B:
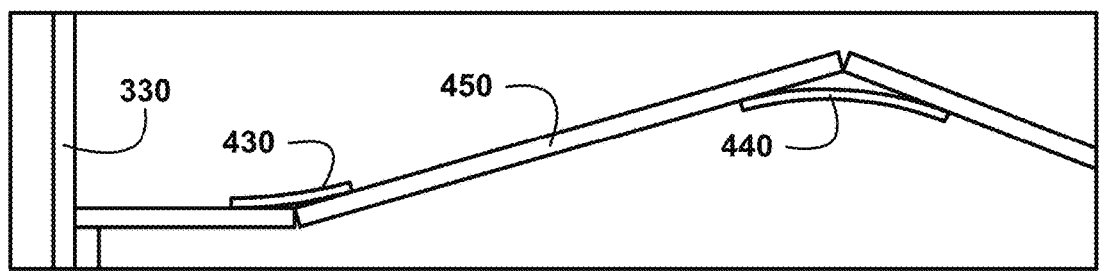
FIG. 4B shows for illustrative purposes only an example of a pool filter guard spreader anchor integrated springs of one embodiment.

A Pool Filter Guard Spreader Anchor Integrated Springs:

FIG. 4B shows for illustrative purposes only an example of a pool filter guard spreader anchor integrated springs of one embodiment. FIG. 4B shows a close-up of detail "B" including the coupling bar 330 and three of the spreader anchor segment 450 sections. The first two segments coming from the coupling bar 330 are hinged by an integrated flexible spring outer plate 430. The second and third spreader anchor segment 450 sections are hinged by an integrated flexible spring inner plate 440. The integrated flexible spring plates are made of semi-flexible materials for example a plastic configured to flex under pressure and return to their original shape when the pressure is removed of one embodiment.

Figure 5:
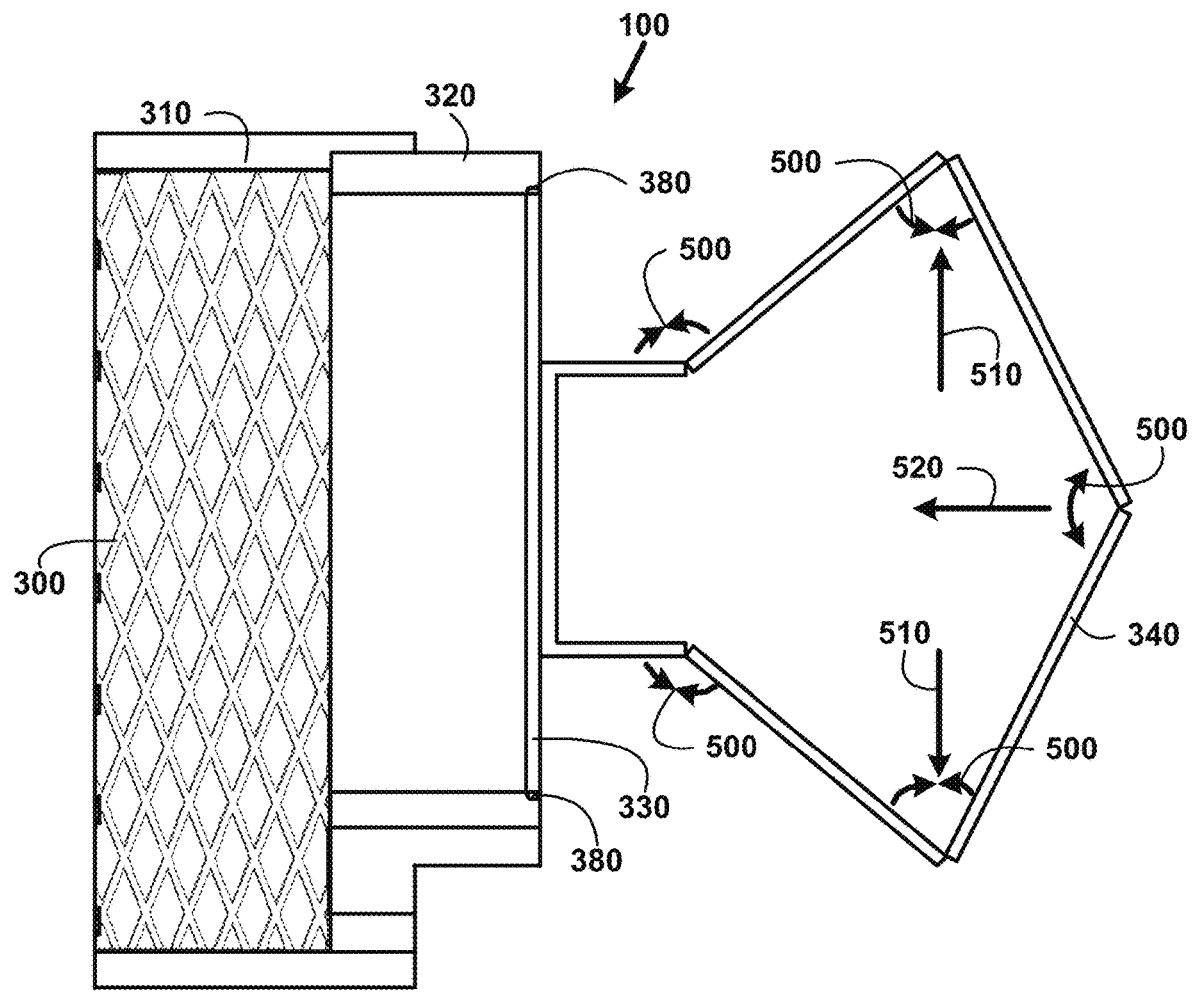
FIG. 5 shows for illustrative purposes only an example of a pool filter guard spreader anchor secured position of one embodiment.

A Pool Filter Guard Spreader Anchor Secured Position:

FIG. 5 shows for illustrative purposes only an example of a pool filter guard spreader anchor secured position of one embodiment. FIG. 5 shows the pool filter guard angular apparatus 100, pool filter guard debris screen 300, top plate 310, top mounting plate 320, coupling bar 330, coupling bar snap-in receptacle 380 and spreader anchor apparatus 340. When the pool filter guard angular apparatus 100 if fully inserted to the skimmer opening wherein the pool filter guard debris screen 300 is against the pool side wall 125 of FIG. 1 the applied pressure is removed. Upon removal of the applied pressure integrated flexible spring outer and inner plates pull and push anchor segments back into a starting position 500. A narrowing angle contracts spreading anchor segments to a lesser angle to extend top to bottom positions 510. Widening top and bottom of spreader anchor segments shortens end segment extended position 520. The top and bottom angled spreading anchor segments press against the top and bottom surfaces of the skimmer opening canal to hold the pool filter guard angular apparatus 100 in position of one embodiment.

Figure 6:
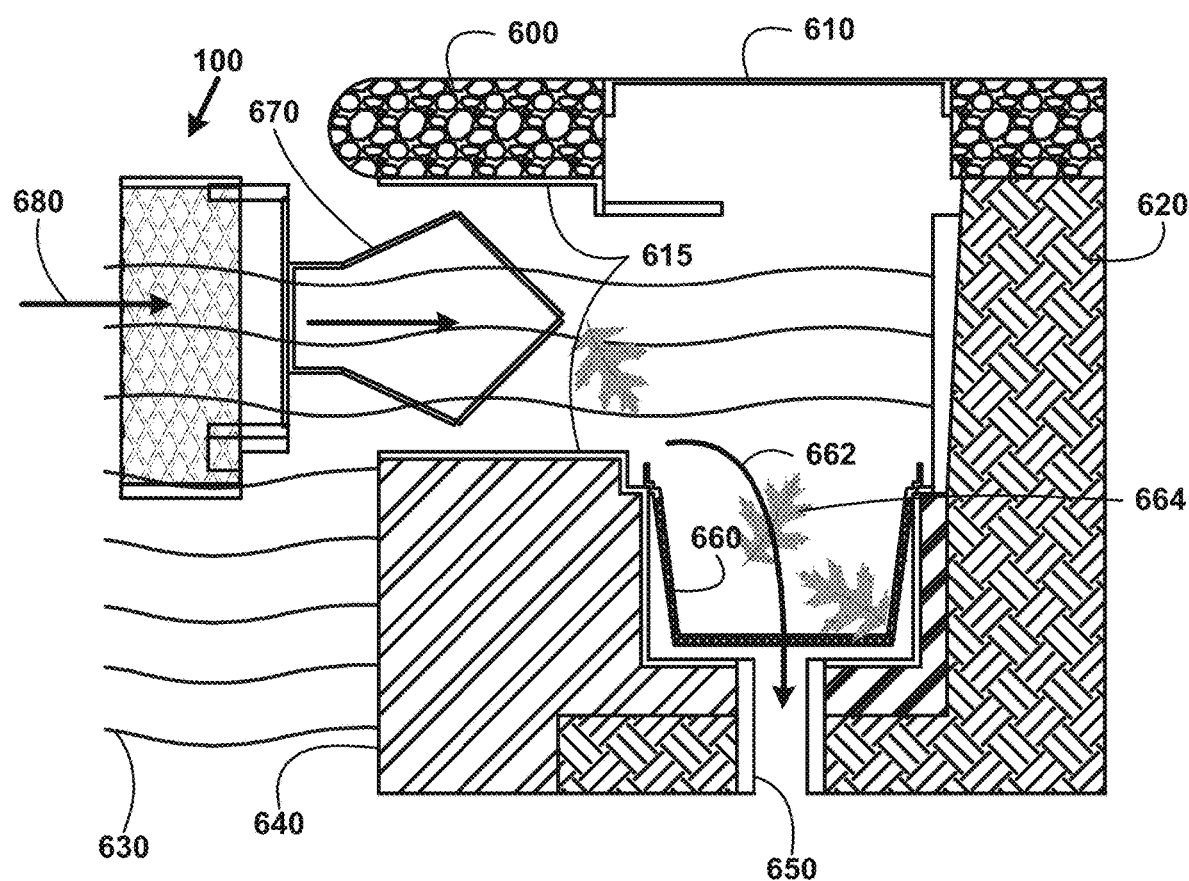
FIG. 6 shows for illustrative purposes only an example of a pool filter guard skimmer pre-installation process of one embodiment.

A Pool Filter Guard Skimmer Pre-Installation Process:

FIG. 6 shows for illustrative purposes only an example of a pool filter guard skimmer pre-installation process of one embodiment. FIG. 6 shows the pool filter guard angular apparatus 100 side view including pool edge coping 600, a skimmer cover 610, a skimmer opening canal 615, earth 620, pool plastered side wall 640, pool water 630, skimmer outflow draw piping 650, and pool water drawn into skimmer debris basket 662. The pool water 630 is being drawn into the skimmer basket 660 which causes debris to be drawn into the skimmer basket 664. Debris accumulates until a user removes the skimmer cover 610 and skimmer basket 660 and empties the debris from the skimmer basket and replaces it in the skimmer. A narrowed pool filter guard angular apparatus 670 results from pressure being applied to the top and bottom segments. Pushing the narrowed pool filter guard angular apparatus into skimmer opening canal 680 is easily inserted as the narrowing reduce the spread distance to less than that of the skimmer opening of one embodiment.

Figure 7:
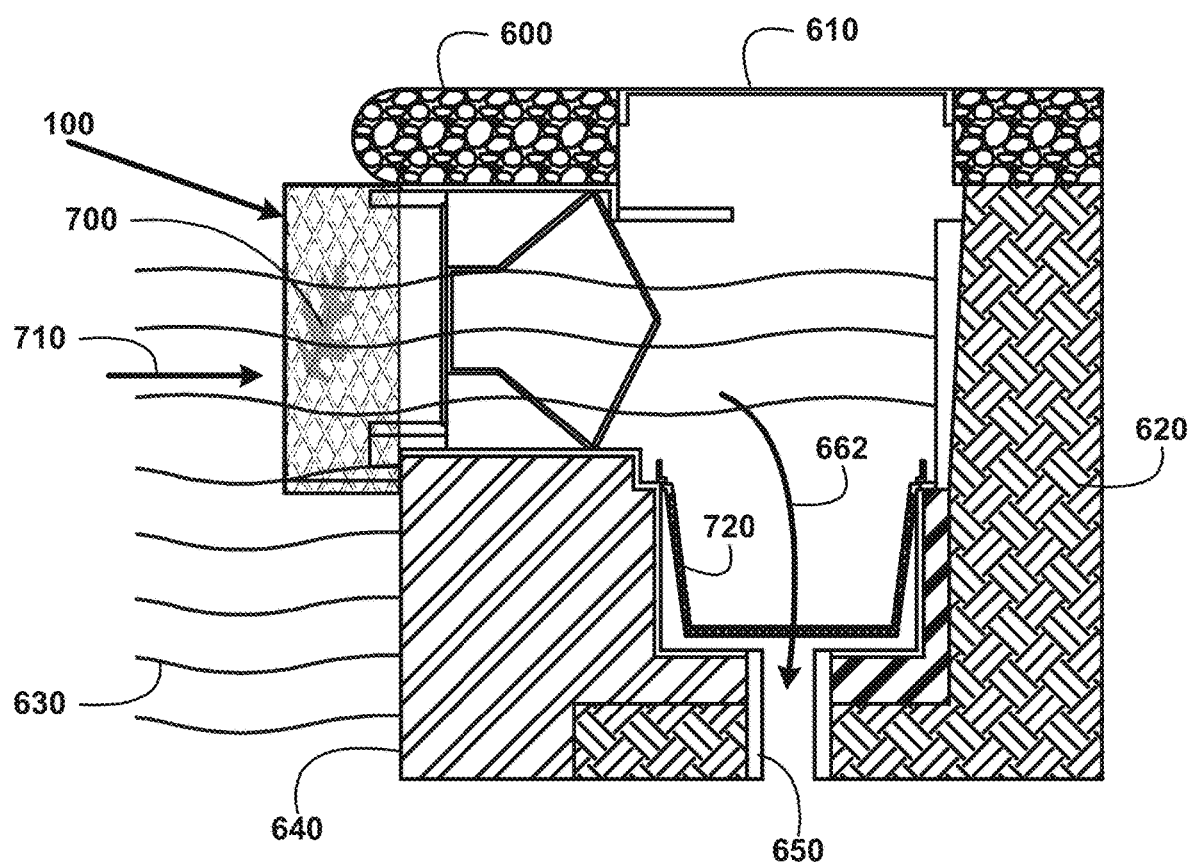
FIG. 7 shows for illustrative purposes only an example of a pool filter guard skimmer installation of one embodiment.

A Pool Filter Guard Skimmer Installation:

FIG. 7 shows for illustrative purposes only an example of a pool filter guard skimmer installation of one embodiment. FIG. 7 shows the pool filter guard angular apparatus 100 installed in the skimmer opening canal. Also showing are the pool edge coping 600, skimmer cover 610, skimmer opening canal 615, earth 620, pool plastered side wall 640, pool water 630, skimmer outflow draw piping 650 and pool water drawn into skimmer debris basket 662. Pool water passing through pool filter guard debris screen 710 allows pool debris to be stopped by pool filter guard debris screen 700. Stopping debris from entering the skimmer, results in a skimmer basket free of debris accumulation 720 of one embodiment.

Figure 8:
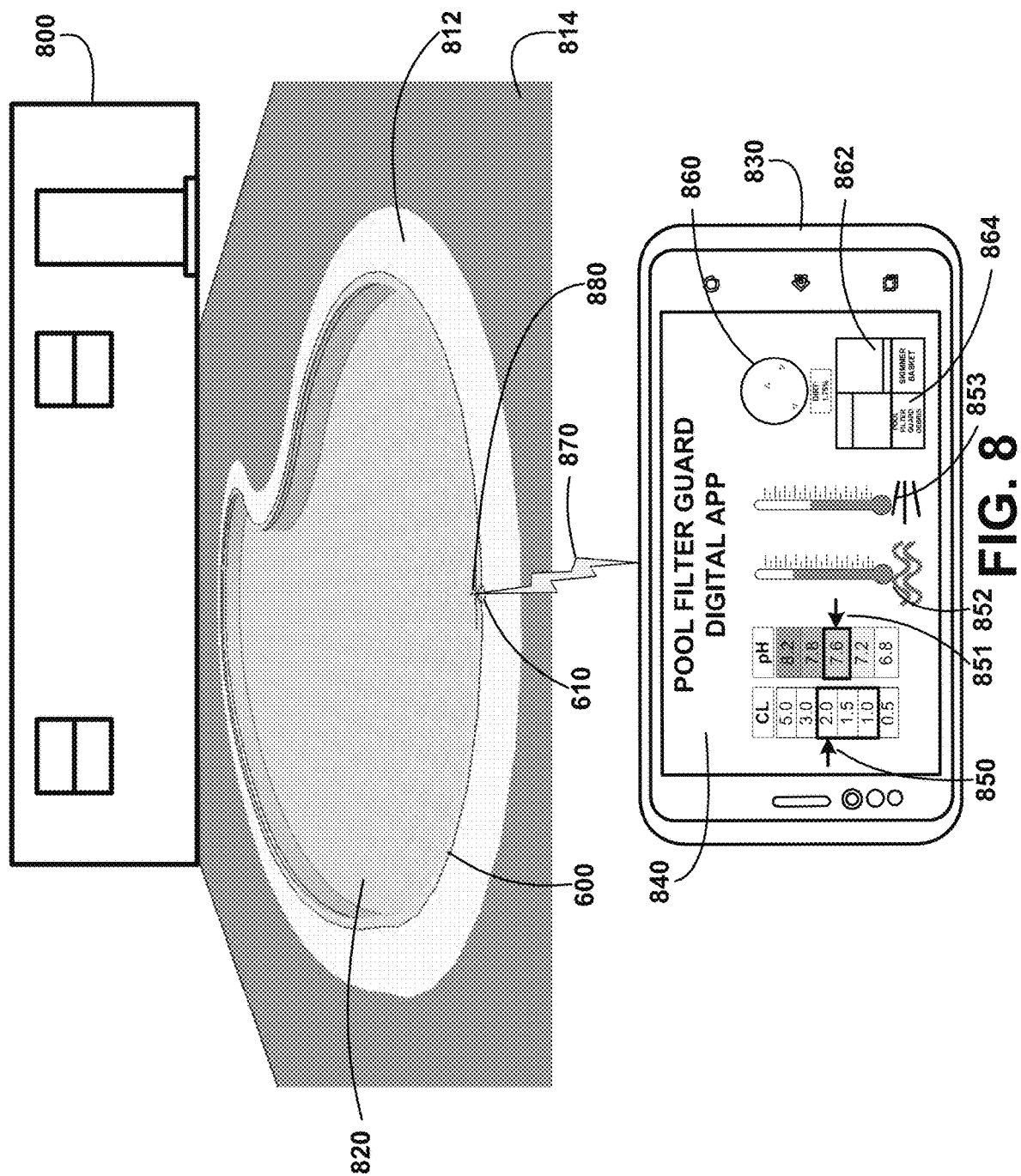
FIG. 8 shows for illustrative purposes only an example of a pool filter guard safety module application of one embodiment.

A Pool Filter Guard Safety Module Application:

FIG. 8 shows for illustrative purposes only an example of a pool filter guard safety module application of one embodiment. FIG. 8 shows a pool owner house 800 with a backyard pool including pool edge coping 600, the skimmer cover 610, a pool water surface 820, pool deck 812 and yard 814. Installed in the skimmer opening is a pool filter guard angular apparatus with safety module 880. A pool filter guard safety module transmitting to a pool filter guard user digital device 870. A pool filter guard user digital device with a pool filter guard digital app installed 830 provides a pool owner with needed information for example on potential maintenance. The pool filter guard safety module transmits current sensor detected chlorine level 850, current sensor detected pH level 851, current sensor detected water temperature 852, current sensor detected air temperature 853, current sensor detected particulate level 860, current sensor detected skimmer basket clogging 862 data and current sensor detected pool filter guard debris level 864 to a pool filter guard digital app 840. The air temperature sensor is located in the pool filter guard safety module tower above the pool edge coping. The chlorine and pH sensors are located below the water level on the bottom plate. The Cl and pH levels detected are transmitted using a Near Field Communication (NFC) to the pool filter guard safety module. The particulate level sensor is located in the bottom plate and includes a clear lens through which a pool water image is captured once a day by an embedded camera. An accompanying digital processor performs an analysis of the pool water image wherein opaque sections of the image are identified as particulates. The percentage of the opaque sections compared to the image area is calculated and report as "Dirt" as shown in FIG. 8. The pool filter guard includes a first digital flow meter located in the bottom plate and a second digital flow meter located on the segmented spreader anchor. The first digital flow meter registers changes in the water flowing past it and decreases in the rate of flow is calculated to report an approximate accumulation of debris on the debris screen which will reduce the flow of water. The second first digital flow meter registers changes in the water flowing past it to the skimmer basket. A difference in that flow detected versus the flow rate at the debris screen is attributable to debris clogging the skimmer basket. Both flow rates are reported as compared to a faster bench mark flow rate when both the debris screen and skimmer basket are cleaned of debris using a Near Field Communication (NFC) to the pool filter guard safety module. Power for operation of the sensors, flow meters and NFC devices comes from an induced current from a waterproof battery device located in a top plate recessed battery receiver that includes induction coils. This transmitted data allows a user to assess the current condition of the pool remotely for example at work wherein they can stop on the way home to pick up pool supplies rather than get home have to perform manual measurement of chemical levels and them make another trip of one embodiment.

In another embodiment the pool filter guard safety module includes digital modules include communication devices, sensors, detectors and meters configured for detecting and measuring the presence of bacteria, viruses and fungi in the pool water. A pool owner may not have been attentive to the addition of chlorine to disinfect the pool water. The digital module communication devices include WIFI and cellular connectivity. The pool filter guard digital app 840 installed on a user's digital device for example a smart phone.

The pool filter guard digital app 840 includes stored identification data on numerous bacteria, viruses and fungi that is automatically updated daily. The digital modules sensors and detectors include biological and chemical sensing and detecting capabilities. The data collected by the sensors and detectors is wirelessly transmitted to the pool filter guard digital app 840. The pool filter guard digital app 840 processes the biological and chemical data for analysis. The analysis determines a match to a stored identified bacteria, viruses and fungi. Any detection of a bacteria, viruses and fungi triggers the pool filter guard digital app 840 to display on the user's digital device an alert that the pool water contains live bacteria, viruses and fungi pathogens and the pool owner needs to add chlorine to the pool water.

If persons or animals are detected in proximity of the pool the pool filter guard digital app 840 will sound an audible alarm with the displayed alert of the presence of pathogens in the pool water. The alert display will be repeated periodically until chlorine is added and the pool water is disinfected and no pathogens are detected of one embodiment.

In yet another embodiment the pool filter guard includes a plurality of ultraviolet (UV) water proof LED lights that expose the pool water entering the skimmer compartment to UV radiation to kill bacteria, viruses and fungi. This additional disinfecting treatment assist the pool owner in keeping the pool water from becoming a source of infecting the people entering the pool of one embodiment.

Figure 9:
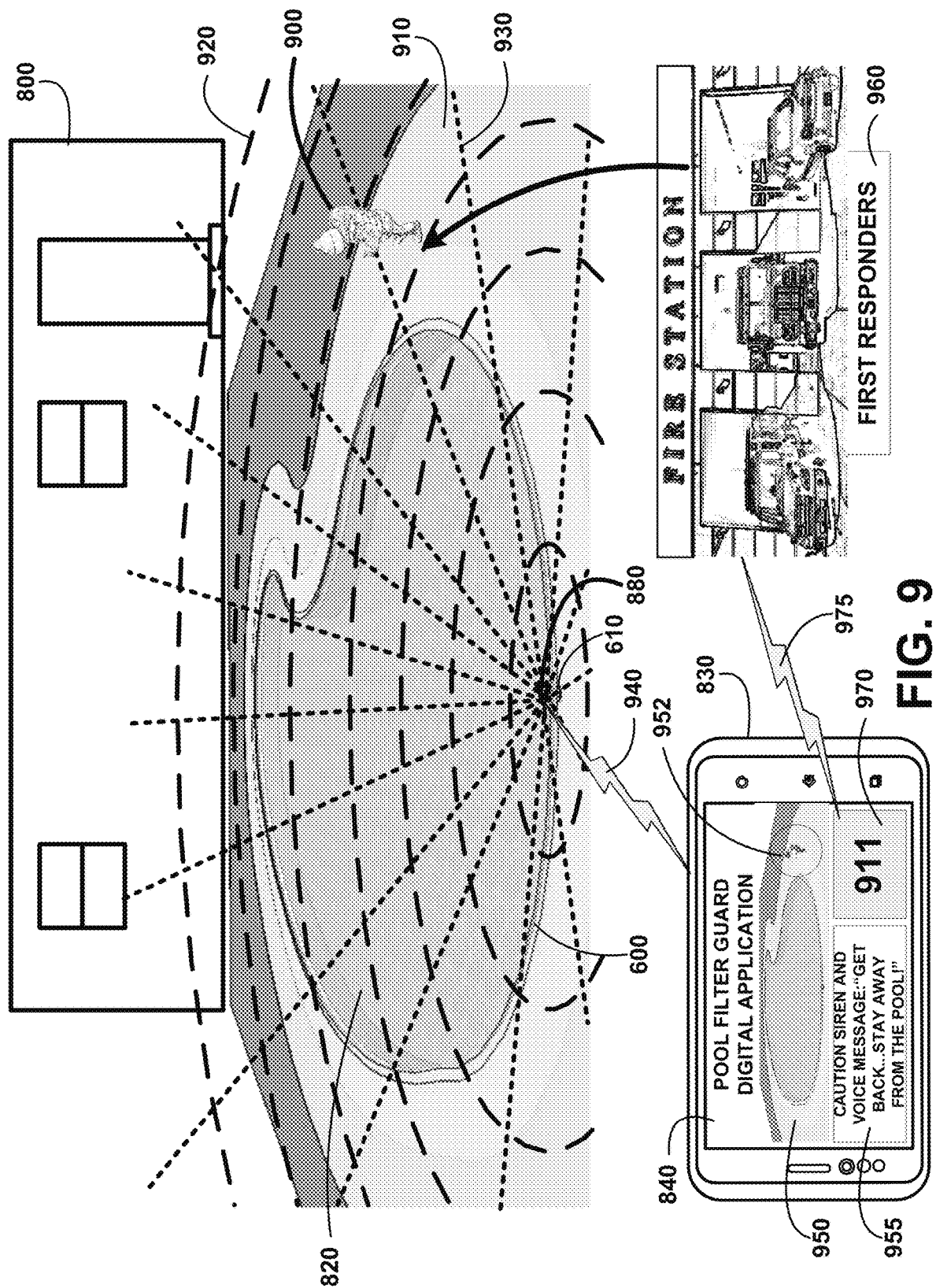
FIG. 9 shows for illustrative purposes only an example of a pool filter guard safety module caution alert of one embodiment.

A Pool Filter Guard Safety Module Caution Alert:

FIG. 9 shows for illustrative purposes only an example of a pool filter guard safety module caution alert of one embodiment. FIG. 9 shows the pool owner house 800, pool edge coping 600, skimmer cover 610, pool water surface 820, and pool filter guard angular apparatus with safety module 880. Pool ownership can be a lot of work for an owner. In addition pools present an open invitation for accidental drownings. Some jurisdiction require perimeter fencing around pool, but many do not. Unfortunately most pool owner cannot be at home all the time and are not able to maintain an around the clock vigil to prevent pets and young children from wandering into the pool. The pool filter guard angular apparatus with safety module 880 performs that vigil 24/7 on behalf of the owner. The pool filter guard angular apparatus with safety module 880 includes a series of features to scan the pool perimeter as shown with an infrared motion detector sensor caution range 920 and an infrared motion detector sensor range caution alert zone 910. The infrared motion detector sensors function at day and night conditions. For example a detected subject crossing into caution zone 900 will trigger a caution alert signal. The caution alert signal is transmitted over both WIFI and cellular to a pool filter guard user digital device with a pool filter guard digital app installed 830. If the detected subject is for example a pool service worker with a pool filter guard digital app 840 installed on their digital device for example a smart phone or tablet they can cancelled the caution alert. The pool owner will automatically receive a call from the pool filter guard angular apparatus with safety module 880 with a video display of the detected subject crossing into caution zone 900. The pool filter guard angular apparatus with safety module 880 transmits to the pool filter guard user digital device with a pool filter guard digital app installed 830 the caution alert. A pool filter guard safety module transmitting caution alert to a pool filter guard user digital device video of detected subject 940 includes a real-time live video transmission 950, automated highlighting of the detect subject 952 and begins broadcasting at the pool site an audible caution alert siren and voice message: "get back . . . stay away from the pool!" 955. The pool owner may elect to press a 911 alert button 970 to cause a rapid response to what could become a dangerous situation. For example the detected subject might be a young child. If they have confidence the detected subject is a responsible adult and is in no danger the owner may cancel the caution alert. If no cancellation is received for example the pool owner has their phone off a 911 automated caution alert call to the nearest first responders, law enforcement and user entered phone numbers 975 if made to the first responders 960 of one embodiment.

Figure 10:
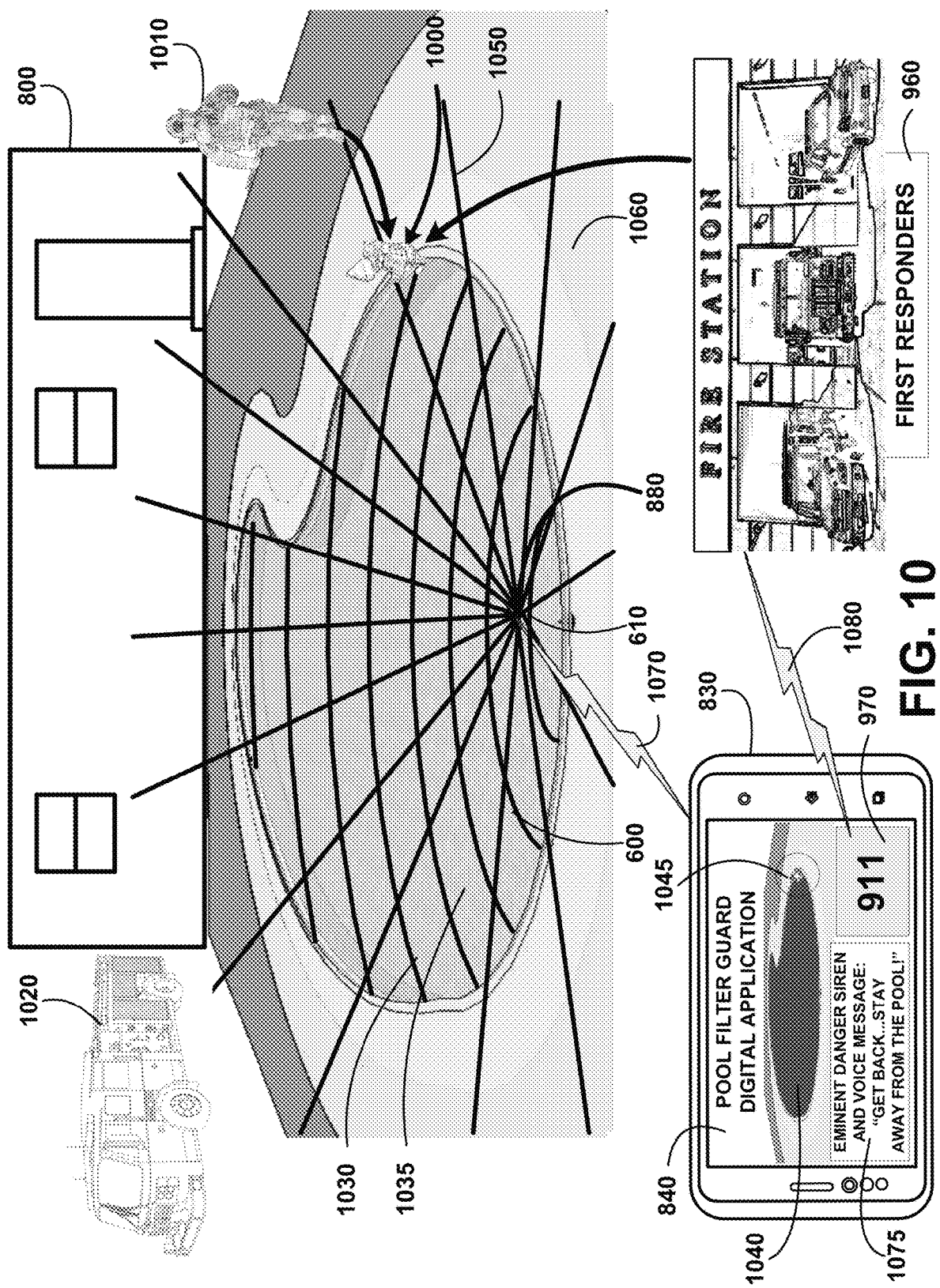
FIG. 10 shows for illustrative purposes only an example of a pool filter guard safety module eminent danger alert of one embodiment.

A Pool Filter Guard Safety Module Eminent Danger Alert:

FIG. 10 shows for illustrative purposes only an example of a pool filter guard safety module eminent danger alert of one embodiment. FIG. 10 shows the pool owner house 800, pool edge coping 600, skimmer cover 610, pool water surface 820 and the pool filter guard angular apparatus with safety module 880. The pool filter guard angular apparatus with safety module 880 includes an infrared motion detector sensor eminent danger pool edge range 1035 and infrared motion detector sensor range eminent danger alert zone 1030.

A detected subject crossing into eminent danger zone 900 will trigger a call to at least one pool filter guard user digital device with a pool filter guard digital app installed 830. The pool filter guard digital app 840 will begin to broadcast an audible eminent danger high volume siren alert broadcast and voice message: "get back . . . stay away from the pool!" 1050. A pool filter guard safety module transmitting eminent danger alert to a pool filter guard user digital device video of detected subject 1070 includes real-time live video transmission 950, automated highlighting of the detect subject 952 and an audible eminent danger alert high volume siren signal and voice message: "get back . . . stay away from the pool!" 1075.

The pool owner may elect to press the 911 alert button 970. Due to the urgency of a quick response to avert a tragedy, the 911 automated eminent danger alert call to the nearest first responders, law enforcement and user entered phone numbers 1080. The pool filter guard safety module using its WIFI and cellular connectivity and a digital processor and digital memory device is configured to search for and record the nearest first responders and law enforcement phone numbers and record user entered phone numbers using the pool filter guard digital app 840. Automated calls to first responders 960 are made without the necessity of pressing the 911 alert button 970.

FIG. 10 shows first responders arrive in a fire truck 1020 and a first responder fireperson rushing to the detected subject 1010 in this example a young child at the pool edge. An average of 10 persons per day die from unintentionally drowning and 5 times that many receive emergency department care for nonfatal submersion injuries. The human tragedy is reason enough to automatically call the first responders. The secondary reasons include pool owner liability which may or may not be covered by their homeowners insurance of one embodiment.

A Wireless Pool Filter Guard Safety Module Waterproof Battery Recharging Device:

FIG. 11A shows for illustrative purposes only an example of a wireless pool filter guard safety module waterproof battery recharging device of one embodiment. FIG. 11A shows a wireless pool filter guard safety module waterproof battery device recharging apparatus 1100 including wireless recharger induction coils 1110 and a wireless recharger AC outlets plug and cord 1120 of one embodiment.

A Wireless Pool Filter Guard Safety Module Waterproof Battery:

FIG. 11B shows for illustrative purposes only an example of a wireless pool filter guard safety module waterproof battery of one embodiment. FIG. 11B shows the wireless pool filter guard safety module waterproof battery device recharging apparatus 1100 with the wireless recharger AC outlets plug and cord 1120. A pool filter guard safety module waterproof battery device 1130 is shown placed in the wireless pool filter guard safety module waterproof battery device recharging apparatus 1100. The pool filter guard safety module waterproof battery device 1130 is encased in a plastic covering to prevent moisture from the pool from shorting the battery of one embodiment.

A Top Plate Recessed Battery Receiver:

FIG. 11C shows for illustrative purposes only an example of a top plate recessed battery receiver of one embodiment. FIG. 11C shows the pool filter guard angular apparatus 100 with a top plate pool filter guard safety module waterproof battery device recessed receiver 1140. This provides a placement location for the pool filter guard safety module waterproof battery device 1130 of FIG. 11B of one embodiment.

A Pool Filter Guard Safety Module:

FIG. 12A shows for illustrative purposes only an example of a pool filter guard safety module of one embodiment. FIG. 12A shows the pool filter guard angular apparatus with safety module 880 including a speaker water shield 1210, audio speaker 1220, infrared motion detector caution sensor 1230, panoramic camera 1240, tower 1270, infrared motion detector eminent danger sensor 1250 and a tower battery insert water shield 1260. The pool filter guard angular apparatus with safety module 880 in another embodiment is used in the same manner on the pool filter guard curved apparatus 200 wherein the top plate includes the top plate pool filter guard safety module waterproof battery device recessed receiver 1140 of FIG. 11C. The safety module includes a cellular transceiver mounted in the tower 1270 of FIG. 12B for transmitting and receiving cellular communication with the user digital device with the pool filter guard digital app 840 of FIG. 8 and for calls to first responders 960 of FIG. 9. The pool filter guard safety module waterproof battery device 1130 of FIG. 11B provides power for the full operation of the safety module functions for an extended time even during an electrical outage to the pool owner house 800 of FIG. 8 of one embodiment.

A Pool Filter Guard Safety Module Battery Key:

FIG. 12B shows for illustrative purposes only an example of a pool filter guard safety module battery key of one embodiment. FIG. 12B shows a portion of the tower 1270, the infrared motion detector eminent danger sensor 1250 and tower battery insert water shield 1260. Also showing is the pool filter guard safety module waterproof battery device 1130 that includes a battery insertion keyway 1295. A safety module tower insertion key 1290 fits into the battery insertion keyway 1295 to ensure the tower is properly inserted. The safety module tower insertion key 1290 includes embedded waterproof wireless circuit connectors 1280 to make a power connection between the pool filter guard safety module waterproof battery device 1130 and the electronic devices in the pool filter guard safety module of one embodiment.

Figure 13:
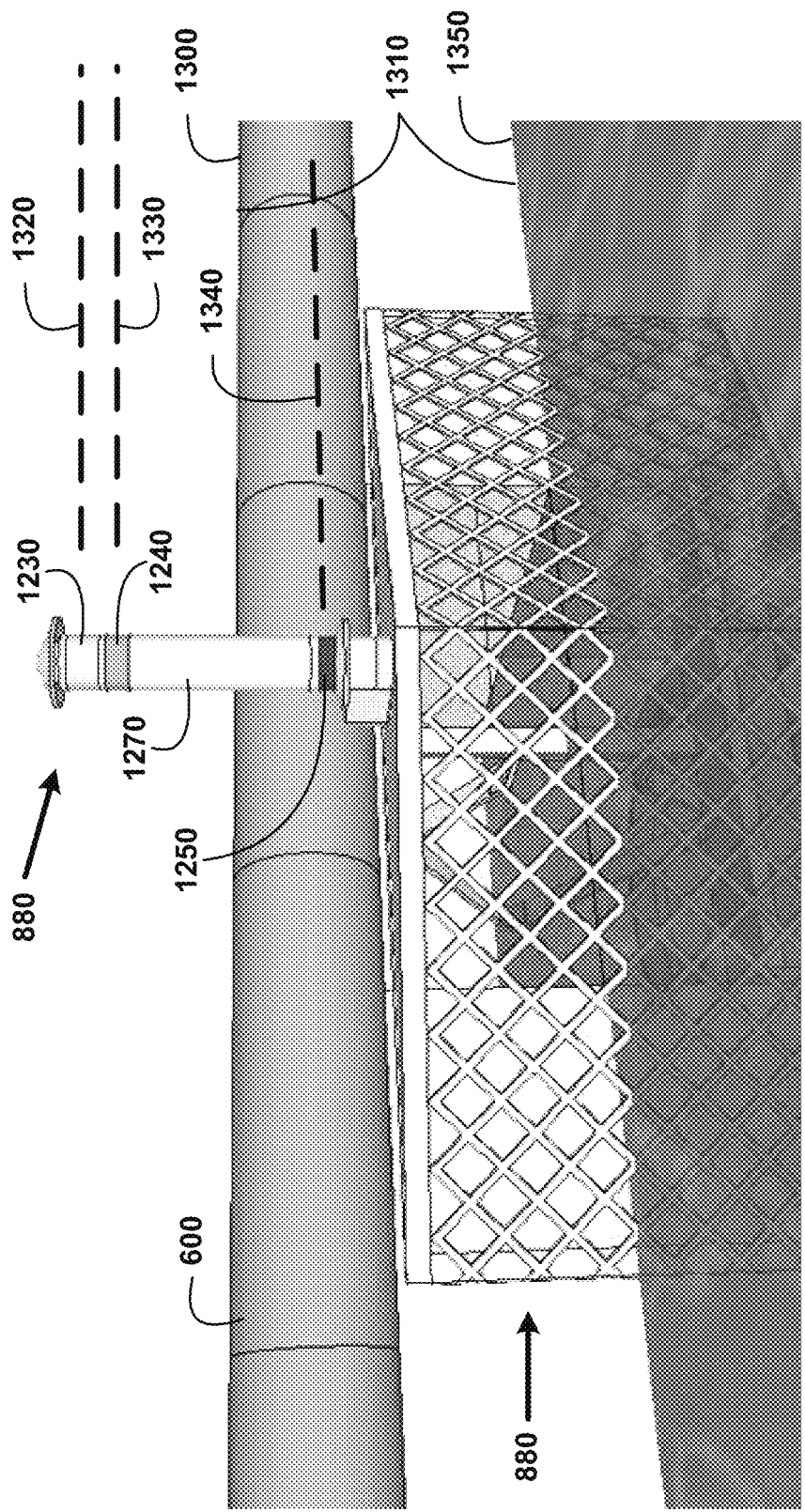
FIG. 13 shows for illustrative purposes only an example of a pool filter guard safety module installation levels of one embodiment.

A Pool Filter Guard Safety Module Installation Levels:

FIG. 13 shows for illustrative purposes only an example of a pool filter guard safety module installation levels of one embodiment. FIG. 13 shows the pool filter guard angular apparatus with safety module 880 and pool edge coping 600. The infrared motion detector caution sensor 1230 is positioned on the tower 1270 at a first distance above the pool deck surface 1320 for coverage around the pool beyond the pool edge coping 600. The panoramic camera 1240 is positioned at a second distance above the pool deck surface 1330 to capture real-time live video also around the pool beyond the pool edge coping 600. The infrared motion detector eminent danger sensor 1250 is positioned a third distance at the center of the pool edge coping 1340 above the pool water level 1350 to detect a subject that has moved into the water area of the pool within the pool edge coping 600 and crossed a fourth distance above the pool water level 1310 of one embodiment.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. An apparatus, comprising:
   a pool filter guard apparatus;
   a safety module coupled to the pool filter guard apparatus configured to detect a subject moving close to a swimming pool and transmit an alert to a user's digital device;
   wherein the pool filter guard apparatus is configured to prevent debris from clogging a pool skimmer basket to prevent pool pump damage;
   wherein the safety module is configured to receive power from a waterproof battery device mounted on the pool filter guard apparatus; and
   wherein the pool filter guard apparatus is configured to include a first part including a pool filter guard debris screen, a top and bottom plate, a top and bottom mounting plate with a coupling bar snap-in receptacle, and a second part including a coupling bar and a spreader anchor apparatus with segments hinged together with integrated flexible spring outer and inner plates.

2. The apparatus of claim 1, further comprising a plurality of infrared detection sensors, chemical testing devices, temperature sensors, and WIFI and cellular connectivity devices, a digital processor, a digital memory device, a panoramic camera coupled to the safety module and powered with a waterproof battery device.

3. The apparatus of claim 1, wherein the pool filter guard apparatus is configured to include a first and second part configured to snap together.

4. An apparatus, comprising:
   a pool filter guard apparatus;
   a safety module coupled to the pool filter guard apparatus configured to detect a subject moving close to a swimming pool and transmit an alert to a user's digital device;
   wherein the pool filter guard apparatus is configured to prevent debris from clogging a pool skimmer basket to prevent pool pump damage;
   wherein the safety module is configured to receive power from a waterproof battery device mounted on the pool filter guard apparatus;
   wherein the pool filter guard apparatus is configured to include a first part including a pool filter guard debris screen, a top and bottom plate, a top and bottom mounting plate with a coupling bar snap-in receptacle, and a second part including a coupling bar and a spreader anchor apparatus with segments hinged together with integrated flexible spring outer and inner plates; and
   said spreader anchor apparatus with hinged segments configured to narrow in a top and bottom dimension when pressed upon for installation insertion into a skimmer opening and wherein the hinged segments rebound when the pressure is released to a starting position to contact surfaces of a skimmer opening canal to maintain the pool filter guard apparatus installed position.

* * * * *